US006981082B2

(12) United States Patent
Ho et al.

(10) Patent No.: US 6,981,082 B2
(45) Date of Patent: Dec. 27, 2005

(54) ON CHIP STREAMING MULTIPLE BUS PROTOCOL WITH DEDICATED ARBITER

(75) Inventors: Ming-Ju Ho, Alpharetta, GA (US); Randall K. Weinstein, Atlanta, GA (US)

(73) Assignee: Agere Systems Inc., Allentown, PA (US)

( * ) Notice: Subject to any disclaimer, the term of this patent is extended or adjusted under 35 U.S.C. 154(b) by 260 days.

(21) Appl. No.: 10/440,385

(22) Filed: May 16, 2003

(65) Prior Publication Data

US 2004/0230729 A1  Nov. 18, 2004

(51) Int. Cl.[7] .................. G06F 13/40; G06F 13/42; H04Q 11/00
(52) U.S. Cl. .................. 710/113; 710/105; 370/364
(58) Field of Search .................. 710/113, 314, 107, 710/240, 241, 305, 316, 307, 105, 51; 370/916, 370/451, 364, 351; 709/253; 712/33; 713/400

(56) References Cited

U.S. PATENT DOCUMENTS

| 4,421,955 | A | * | 12/1983 | Mori et al. .................. 379/269 |
| 5,506,995 | A | * | 4/1996 | Yoshimoto et al. .......... 710/107 |
| 5,887,144 | A | * | 3/1999 | Guthrie et al. .............. 710/300 |
| 6,154,799 | A | * | 11/2000 | Gafford et al. ............. 710/107 |
| 6,195,723 | B1 | * | 2/2001 | Neal et al. .................. 710/313 |
| 6,223,237 | B1 | * | 4/2001 | McDermid .................. 710/307 |
| 6,738,845 | B1 | * | 5/2004 | Hadwiger et al. .......... 710/240 |

OTHER PUBLICATIONS

"Distributed admission control for supporting isochronous traffic in DQDB MANs" by Yuang, M.C; Chen, C.S. (abstract only) Publication Date: Jun. 18-22, 1995.*

* cited by examiner

Primary Examiner—Gopal C. Ray

(57) ABSTRACT

The present invention creates dedicated point-to-point or point-to-multipoint links between different devices along plural busses. Synchronized clocks to each device enable proper timing of read and write operations to/from the bus. The bus connection between the devices are selectively switchable so that dedicated bus connections between devices can be switched on and off as needed. Since the links are point-to-point between sending and receiving devices, the throughput of star-like topology (e.g., Ethernet) can be achieved with very low latency. An arbiter creates the link. The link is established indefinitely, for as long as the arbiter configures it to exist. Additional transactions through the link require only a frame signal to be asserted by the sender and the frame signal to be interpreted as a"data ready" signal by the target.

10 Claims, 4 Drawing Sheets

ON CHIP STREAMING MULTIPLE BUS PROTOCOL WITH DEDICATED ARBITER

FIELD OF THE INVENTION

The present invention relates to bus architecture and, more particularly, to high-speed bus architecture that provides for multiple, parallel bus transactions.

BACKGROUND OF THE INVENTION

Utilization of a bus is a well known technique for allowing shared communication between multiple devices. For example, in a bus, all communication devices share a common path. Bus architectures work similar to a highway system, where a wide major highway may provide simple and affordable access to many cities and towns located along the highway. A single bus provides shared access to many devices along the shared path (bus).

As more and more cars enter a highway from the many towns along its path, the highway becomes more crowded and traffic flows more slowly. Similarly, various types of bus architectures can suffer from similar difficulties. There are two elements to performance of a bus, throughput and latency. The throughput of data is simply the speed with which data will travel along the bus, and could be considered analogous to the speed limit on a highway. For example, a 100 Mbit Ethernet adapter can transport data with a throughput of 100 megabits per second. Latency is defined as the time required to pass a frame (e.g., for Ethernet, a preamble, start-frame delimiter, destination address, source address, length and type field, data, and frame-check sequence) from the source to the destination on the bus. When there is more traffic on the bus, it becomes increasingly more difficult to find an opening on the bus to place data, causing an increase in the latency. Essentially, more congestion increases latency; the throughput always remains the same for the bus.

The more devices there are connected to the bus, the more traffic (e.g., data) will be flowing along the bus and therefore, the more congested and slow the data or other communications will travel. However, like the highway system, despite drawbacks, current bus architectures have provided an adequate means for interconnecting multiple devices for communication.

There are several different bus architectures used today. Busses such as a PCI bus, illustrated in FIG. 1, use a single multiplexed wide data and address bus, implementing a tree topology, to move data from one device to another. Referring to FIG. 1, a processor 102 and memory 104 are directly connected to a host bridge 106. These elements and their interconnections comprise the "local bus" of the system (e.g., computer, game console, etc.) in which they operate. The host bridge 106 is responsible for bridging between the local bus and the PCI bus, described in more detail below. In addition, the host bridge 106 is responsible for controlling and buffering all the data going to and from the memory 104. In the architecture illustrated in FIG. 1, all devices are memory-mapped, meaning that they can be referenced as if they were part of memory. It is the job of the host bridge 106 to determine whether or not the memory location requested is located in the local memory or on the PCI bus and return or write the data to the correct location.

Host bridge 106 is connected to bus 108. Bus 108 connects the host bridge to PCI devices, e.g., networking adapter 114, video card or hard-drive controller 116, and PCI to ISA bridge 118. These elements and their interconnections comprise the PCI bus. Three representative devices 114, 116, and 118 are shown, but these devices could be any devices such as a networking device, video, hard-drive controller, bridge to PCI, encryption coprocessor, video compression encoder/decoder, etc. These devices may be memory mapped or may implement direct memory access (DMA), which means that a device can automatically read and write data to memory, without requiring the data be handled by the processor 102.

The PCI to ISA bridge 118 couples the PCI bus to the bus 110. Coupled to the ISA bus 110 are input devices 120, slow interface 122, and other slow hardware 124. These elements and their interconnections comprise the ISA bus. All devices on the ISA bus "look" as if they are part of the PCI to ISA bridge 118. All traffic from these devices needs to pass through the PCI to ISA bridge 118 up to the processor 102, since these devices do not implement DMA. Using a PCI bus architecture such as that shown in FIG. 1, one device must take control, or master, the bus. During a transaction to a target, the master is also known as the initiator.

The configuration of the devices through the PCI is performed through a CONFIG command given over the PCI bus. All PCI transactions begin with a command and, just as READ and WRITE operations have their own commands, CONFIG READ and CONFIG WRITE also each have their own commands. The CONFIG commands initiate a configuration transaction that either writes to or reads to a standardized set of registers. Configuration is not a line-speed operation, i.e., it does not need to be done at the same rate as the data is processed. The actual processing of the data utilizes the bus, making use of its high throughput potential. Another bus can handle slower speed configuration.

Another type of bus implements a ring topology, such as token ring, illustrated in FIG. 2. As is well known, devices 202, 204, 206 and 208 must arbitrate for time on the bus 210 and then send their data around the "ring" (the bus 210). The ring is connected to each device, and any device can have access to the data at any time on the ring. A "token" 212, which is a special bit pattern, travels around the ring. To send a message, a device "catches" the token, attaches a message to it, and then lets it continue to travel around the network.

Tree topology protocols such as PCI suffer from high complexity and high overhead. Wide busses running at high speeds are usually necessary to reach desired speeds, as the theoretical throughput is much higher than what is generally realized. Long data bursts can cause contention for the bus as other devices seek access. Large buffers are necessary at each device to survive long latencies that can occur when contending for the bus.

Ring topologies such as a token ring require all data to pass by all devices. Each device must check the header of every packet to see if it is the destination. When one device has control over the bus (controls the token in a token ring implementation), other devices must wait until the token is free or until they are a high enough priority to seize the token. While latencies can be deterministic, the throughput can never reach the theoretical maximum as multiple devices attempt to use the ring simultaneously, since throughput can never exceed the allocated time slices.

Other bus architectures implement star topologies, a common example being Ethernet. In a star topology system, each device is commonly connected to a common device, typically some type of bridge, through a dedicated link. To route from one device to another, the bridging device must disassemble the data frame from the sending device and repackage it and then send it on the link to the receiving device. Star topologies such as Ethernet require dedicated physical links for transmission. While they can be high speed, a transaction typically requires several jumps between destinations giving rise to high latency. Star topologies sacrifice latency for high throughput. Star topology is somewhat analogous to methods used for package delivery. For example, Federal Express has an East hub where all packages east of a particular part of the United States are initially sent to before being forwarded to their final destination. By aggregating resources, they are able to handle large quantities of packages, i.e., they have high throughput. However, shorter latency (e.g., longer than next-day service) would be possible if a truck was always available to drive a package directly from the source to the destination.

Performance of a transaction, regardless of the bus used for the transaction, follows some general guidelines. Busses using higher bandwidth mediums (fiber optics instead of copper; cable TV lines instead of POTS; differential vs. single-ended signaling) will generally allow for increased performance. For a given type of medium, performance will generally be better over shorter distances. In addition, performance is only as good as the slowest component in the link. The slowest component can be slow either by its nature or because it is too busy handling other requests.

Generally, a tree topology typically requires every device to wait when another device is using the tree. A ring topology does not allow one device to inhibit the use of the capacity by the other devices, but it won't allow a device to use more than its share. A star topology requires the devices at the center of the star (in Ethernet, the switch or the router) to be fast enough to handle as much traffic as required. The switch/router must scale proportionally with the number of branches hanging off of it, leading to scalability problems.

Thus, it would be desirable to have an efficient way of selectively creating temporary point-to-point bus connections between devices on an as-needed basis, and to have the capacity for each device to be connected along point-to-point bus connections simultaneously.

SUMMARY OF THE INVENTION

The present invention creates dedicated point-to-point or point-to-multipoint links between different devices along plural busses. In a preferred embodiment, all of the devices and busses are on the same chip or PC board. Synchronized clocks to each device enable proper timing of read and write operations to/from the bus.

The bus connection between the devices are selectively switchable so that dedicated bus connections between devices can be switched on and off as needed. Since the links are point-to-point between sending and receiving devices, the throughput of a generalized star topology (e.g., Ethernet) can be achieved with very low latency. An arbiter creates the link. The link is established indefinitely, for as long as the arbiter configures it to exist. Additional transactions through the link require only a frame signal to be asserted by the sender and the frame signal to be interpreted as a "data ready" signal by the target. It does not require the complex bus negotiations as required by a protocol like PCI. Multiple busses are available to the arbiter to allocate so that one device need not wait for another device to finish their transaction. Further, each bus need only run at the speed necessary for the device to which it is dedicated, thereby reducing overall power consumption.

DETAILED DESCRIPTION OF THE PREFERRED EMBODIMENTS

Figure 1:
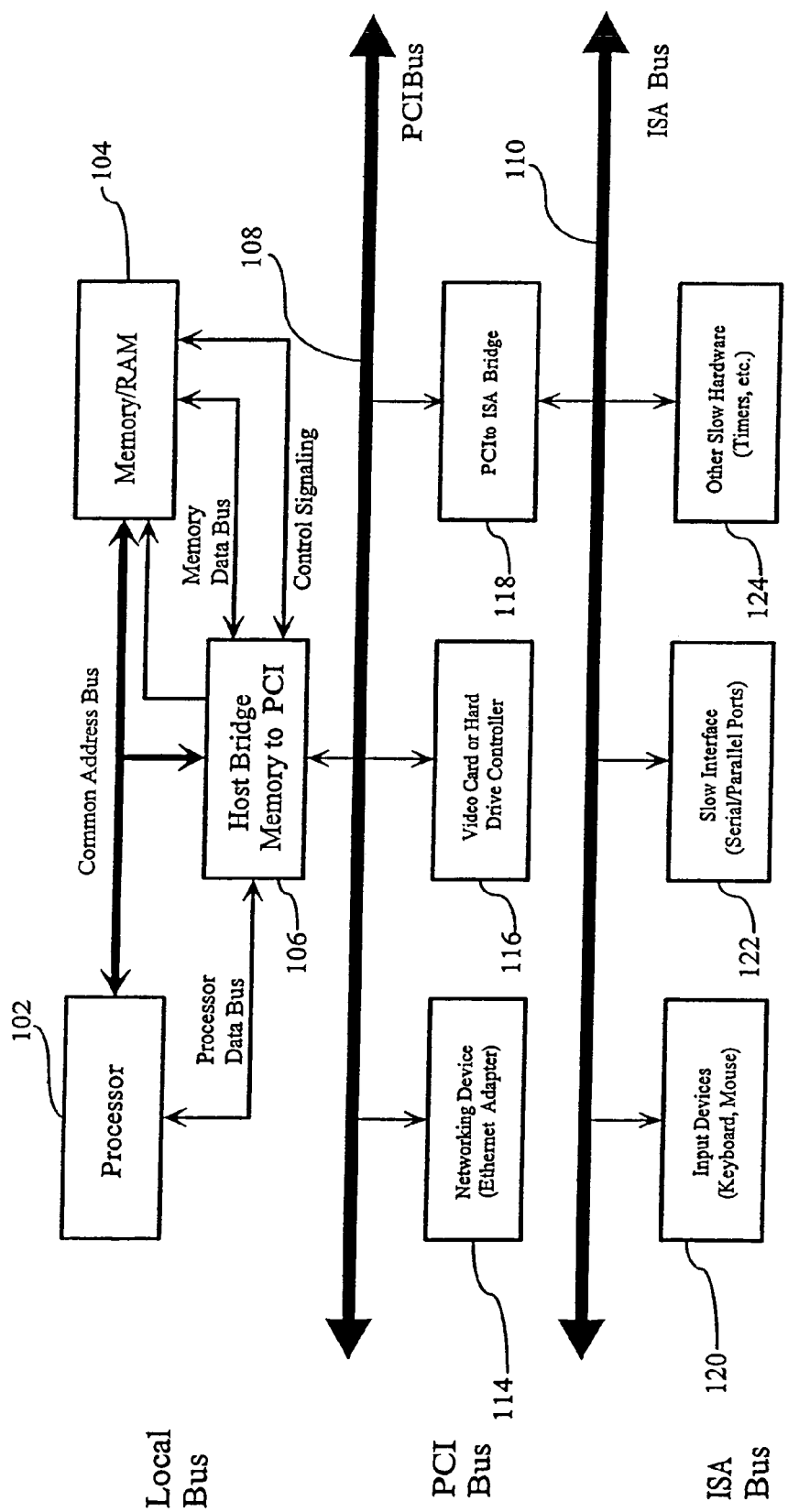
FIG. 1 illustrates a typical PCI bus architecture of the prior art.
Figure 2:
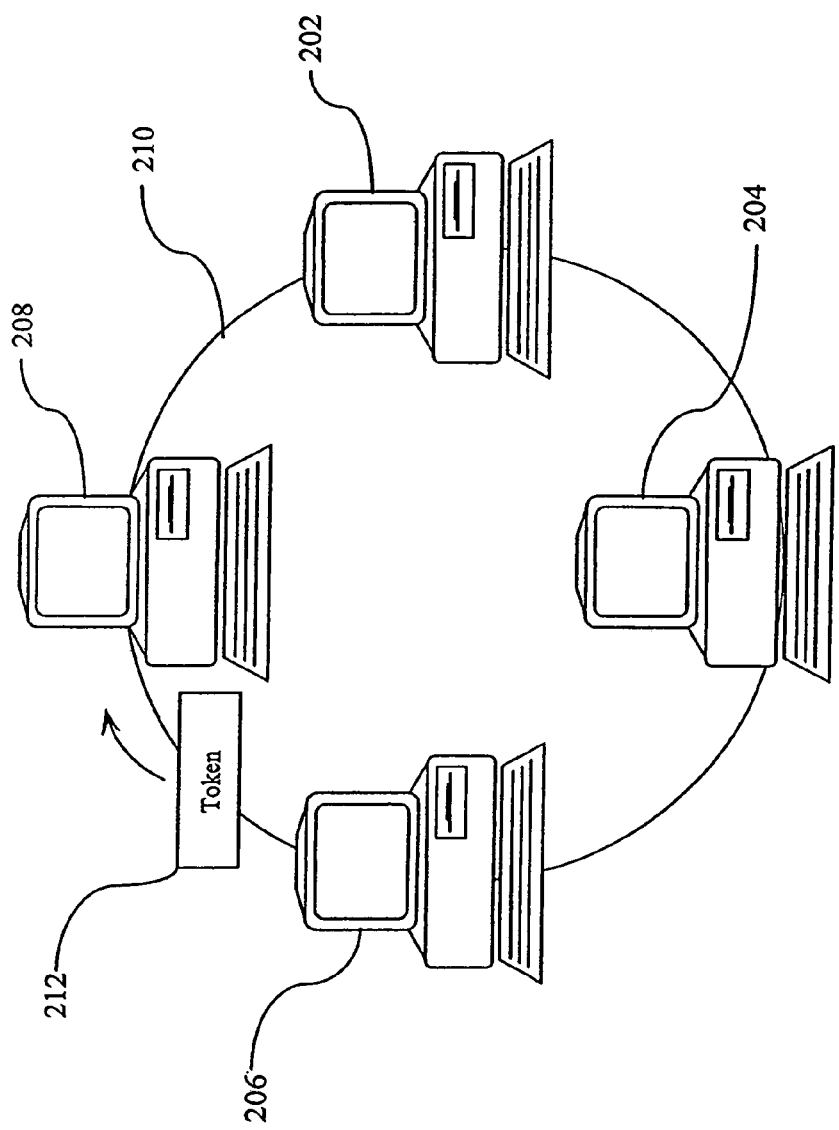
FIG. 2 illustrates a typical ring topology of the prior art.
Figure 3:
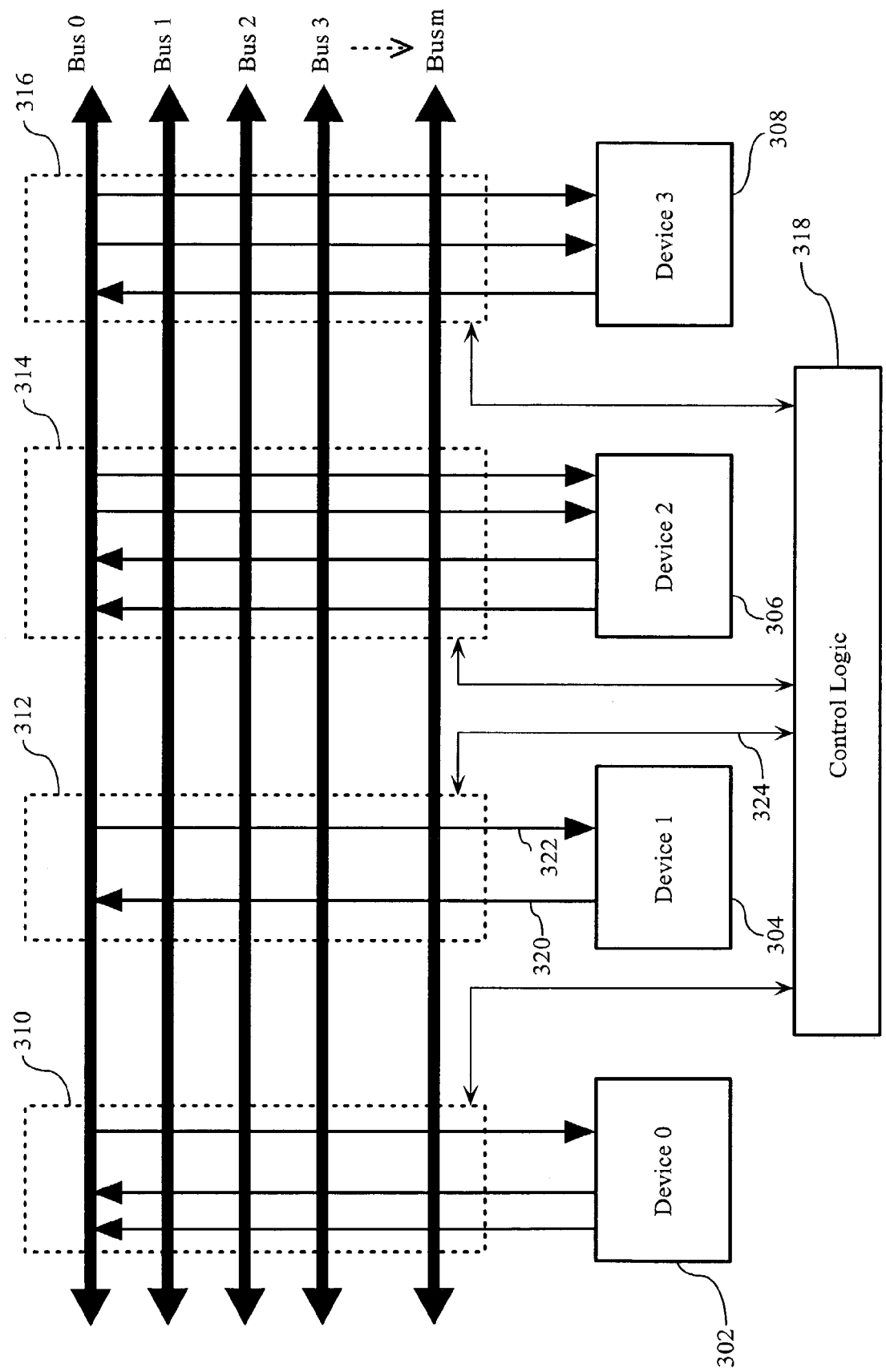
FIG. 3 illustrates a general overview of the architecture of the present invention.

FIG. 3 illustrates a general overview of the architecture of the present invention. Referring to FIG. 3, a series of busses (bus 0, bus 1, bus 2, bus 3, . . . bus m) are configured for parallel operation so that devices 302, 304, 306, and 308 can be selectively connected to any of the busses. This is accomplished via bus selection elements 310, 312, 314, and 316 respectively. Each input and output of devices 302, 304, 306, and 308 is selectively connectable to each bus, bus 0 . . . bus m. In addition, each bus selection element is coupled to control logic element 318, which provides the control (arbitration) function to allow individual selection of the bus connections to the input and output ports of each device. Control logic element can comprise, for example, a general purpose processor (microprocessor or microcontroller), a specific purpose processor (custom instruction set or DSP), a static configuration memory, or any form of a hardware based finite state machine.

The control logic element 318 (also referred to as the arbiter) performs several tasks. First, it must control the overall program execution flow, guiding the device operation such that overall systems perform as expected. As part of that task, it must be able to reconfigure the throughput operation as required by the particular configuration instructions. The bus may or may not need to be reconfigured. The set of instructions that configure the devices and the bus array to process the data as required by a particular algorithm will also determine whether or not the bus needs reconfiguration. For example, one algorithm may require 50 byte chunks of data to be encrypted individually and have a frame check sequence appended thereto. Another algorithm may require decryption over an arbitrary number of bytes with verification of the frame check sequence. The configuration instructions executed by any number of possible units (processor, hardware, finite state machine, listing of static commands, etc.) will be required to configure the security device for encryption mode or decryption mode, the frame control sequence device for creating a sequence or verification of a sequence, the memory device for fetching the set length data blocks or variable length blocks, and the configuration of the bus array to connect the devices in the necessary way to facilitate movement of the blocks to and from each processing device.

The control logic element 318 must also be able to configure the device's mode of operation. Configuration is done outside the bus described in the invention. The device may be single function or it may have some type of reconfigurability and flexibility. The configuration bus can handle the setting up of the particular mode of operation as required by the configuration program.

Figure 4:
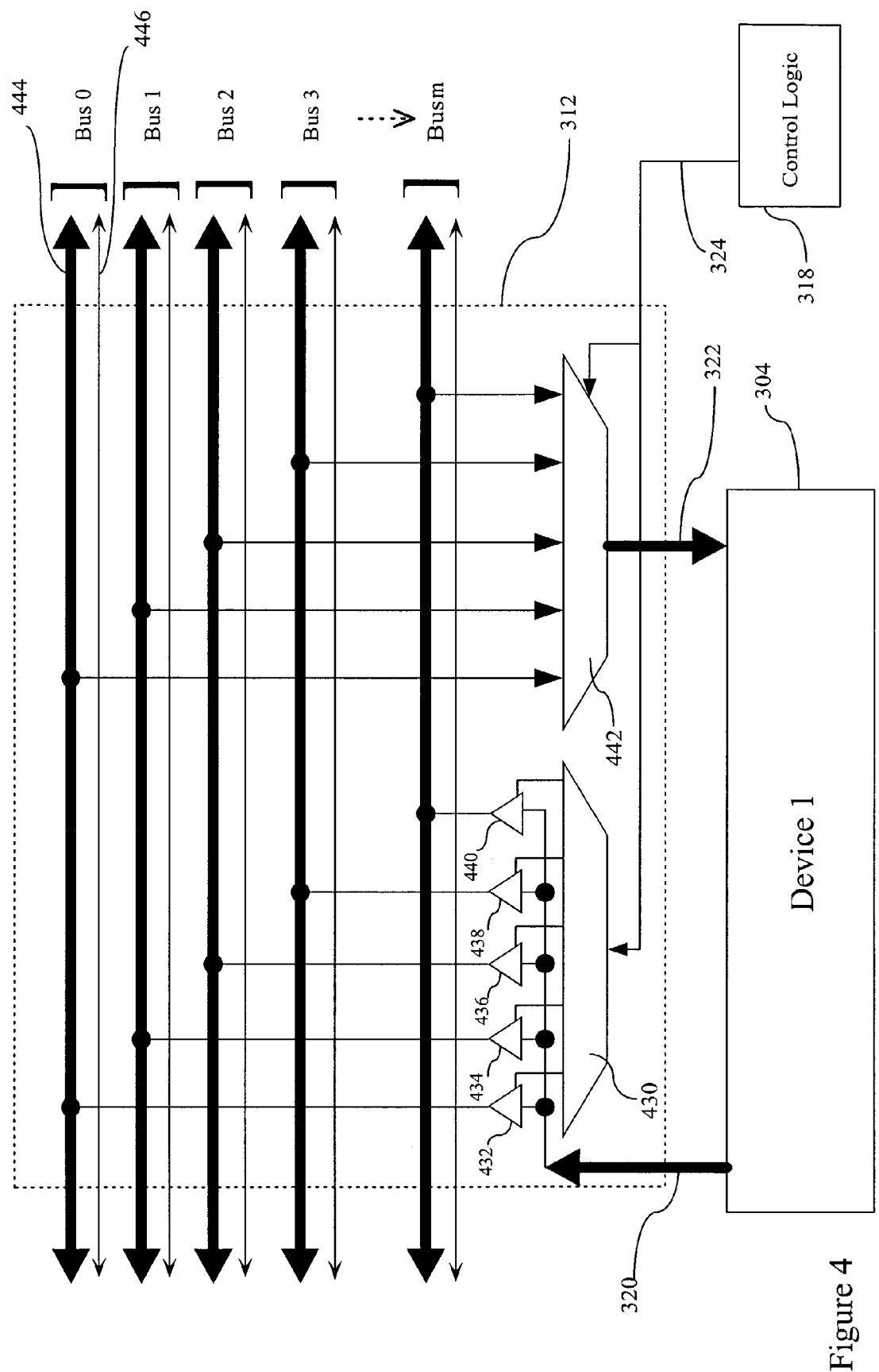
FIG. 4 is a block diagram showing a more detailed view of bus selection element 312 and its connection to device 304 and control logic element 318.

Details of a preferred embodiment of the bus selection elements are described in connection with FIG. 4. FIG. 4 is a block diagram showing a more detailed view of bus selection element 312 and its connection to device 304 and control logic element 318. The configuration illustrated in FIG. 4 is typical for each device, the only difference being the number of inputs/outputs that may be required, depending upon the particular device. Referring to FIG. 4, device 304 has an output 320 and an input 322, each of which are connected to bus selection element 312. In addition, control logic element 318 has a control connection 324 connected to bus selection element 312.

Each output from a device to the busses includes a demultiplexer 430 (e.g., an SN74F138 demultiplexer) and associated switching control elements 432, 434, 436, 438, and 440. Further, each device input includes a multiplexer 442 (e.g., an SN74F126 multiplexer) as shown. Each demultiplexer and multiplexer has connections to each bus as shown.

The demultiplexers and multiplexers provide the ability to selectively connect the output of a device to a selected bus, and to control the input from selected busses to the device. As shown, each bus comprises the active bus itself and an associated control line, which carries a "frame signal", the function of which is described in more detail below. For example, in FIG. 4, bus 0 comprises an active bus 444 and an associated control line 446. This configuration is typical for all busses (bus 1, bus 2, bus 3, . . . bus M).

The operation of the present invention is now described with reference to FIG. 3. As an example, assume that device 302 wants to send two streams of data for processing to device 306, which requires two operands. Device 306 requires both operands to be available simultaneously. Control logic element 318 configures bus selection element 310 associated with device 302 to drive one output to bus 0 and the other output to bus 1 by activating the appropriate switching control elements (not shown in FIG. 3, but analogous to that shown in FIG. 4 for bus selection element 312). Control logic element 318 then configures bus selection element 314 via its multiplexer to configure bus 0 to drive the first input of 306 and bus 1 to drive the second input of 306. The configuration phase is complete at this time. At an arbitrary time later, device 302 will begin to transfer data across the bus. Device 302 will assert the frame signal on the control lines associated with bus 0 and bus 1 and begin transferring a multiple of bits (e.g., a 16-bit word; a 32-bit double-word; a 4-bit quarter-word) across each bus, synchronized by a system-wide clock. Upon transfer completion, device 302 will de-assert the frame signals on the control lines associated with bus 0 and bus 1. Device 306, being a synchronous device with respect to the bus, will latch data off of bus 0 and bus 1 upon detection of the asserted frame signal. Device 306 will subsequently latch in an additional multiple of bits for every clocked time period (once per each clock pulse, or multiple times per clock pulse). Device 306 will proceed with processing the two streams of data until the frame line on each bus becomes de-asserted, signifying the end of transmission. As required by the protocol (i.e., the program running on control logic element 318 that controls the devices and busses), device 306 may output one or more streams of data to other devices to continue processing.

In this configuration, each bus is a point-to-point or point-to-multipoint link that passes arbitrary length streams of data. The output port of a device can always transmit at least one stream of data at a time on one or more busses, but each device can have multiple output ports if required. Input ports similarly can only have one device driving them at a time, or can (and often will) require multiple input ports. Each input and output port has a separate location on the device, connectable separately to the busses. A device that encrypts/decrypts data might only have one input port (plaintext, for example) and one output port (encrypted ciphertext, for example). A device such as an ALU might have two input ports for two operands and one output port for the result. A third device may be a dual port memory having two input ports and two output ports.

Busses are clocked depending on the data that needs to be transmitted. The parallel-configured busses are designed as a synchronous system such that the throughput of each bus is directly proportional to its clock speed. There is no overhead once a link is created, since data is the only traffic on the bus and, therefore, the speed of the bus is equal to the speed of the data. A PCI bus, as an example, has an address cycle and additional control cycles to be transmitted before data can be transmitted, affecting the data throughput. However, with the present invention, data can be transferred as fast as or as slow as it needs to for the application at hand since no other devices are competing for use of the bus. For example, if an encryption device is attempting to encrypt a stream of data at 100 Mbps, the bus needs to be clocked to transfer 100 Mbps, i.e., 100 Mb/bus width=clk rate. Each bus is an arbitrary width and, as described above, includes one control line along which the frame signal travels.

The frame signal is bi-directional and is asserted by the host at the start of data transmission and is interpreted as a data ready signal by all receiver devices. The frame signal bounds the data transmission, that is the frame signal is asserted during transmission and de-asserted after transmission. In the case of an "active high" signal, assertion means 1, de-assertion means 0. "Active low" is opposite. An active high frame will be low until data needs to be transmitted. Then the frame signal will turn to 1 and data will be transmitted. Upon completion, the frame signal will be brought back down to 0. In other words, the assertion and de-assertion of the signal "bounds" the data transmission.

The bus must propagate data ensuring setup timing constraints are met on the receiving device. Each data transfer must occur in a single cycle.

The multiple busses of the present invention function in parallel creating simultaneous and selectable direct links between the devices. When a data transfer is to begin, the control logic element 318 picks an unused bus and configures the output of the sending device to drive that bus, i.e., the selected bus will be used for the data transfer. The control logic element 318 also sets up the receiving end by using multiplexors to choose the same bus to drive the input ports on the receiving devices. Any known methods can be used to drive the busses, e.g., combinational logic solely, best suited for smaller, or low speed busses, or by using tri-state logic for the bus, i.e., multiple drivers selectable by a decoder as shown in FIG. 4.

This invention has many advantages. It is an efficient, high speed bus system. Since there is no overhead and only data is transmitted between devices, transactions take no more time than the propagation time through the bus. Also, the inventive system has very low latency. The first word transmitted on a clock edge in the transmitting device is available on the next clock edge at the receiving device. In addition, each device requires only a simple interface. A device only requires a single register as the input stage into the processing pipeline of the device. Control logic is limited to supplying a write enable signal and interpreting a data ready signal, i.e., the frame signal. Bus arbitration and selection is handled by external devices, such as hardware state machines or a general-purpose processor.

The configuration of the devices is done through the same bus. Devices can be memory mapped where it is possible to burst data to the device once a bus transaction has been arbitrated. Devices can also be I/O mapped where one data word is sent per bus transaction.

Power is kept to a minimum as busses are only switching when data is being transmitted and because it is clocked only at the speed necessary, and transactions can be arbitrary in length. With PCI, there are maximum burst sizes and in Ethernet there is a maximum packet size. Transactions on the bus of the present invention have no such requirements; they can be one word, or theoretically, infinitely long. Further, the bus intrinsically has support for multicast transmissions by being able to drive multiple input ports from one output port. In addition, multiple busses allow multiple transactions between disparate devices. A connection between two or more devices will not stop a separate connection to be made between a different set of devices, ensuring all devices have access to the busses when required.

Although the present invention has been described with respect to a specific preferred embodiment thereof, various changes and modifications may be suggested to one skilled in the art and it is intended that the present invention encompass such changes and modifications as fall within the scope of the appended claims.

We claim:

1. A bus architecture, comprising:
   a plurality of busses;
   one or more devices requiring connectivity to said plurality of busses; and
   an arbiter providing selective connectivity of said one or more devices to said plurality of busses, whereby each device can be selectively connected to and disconnected from each of said busses based on control by said arbiter;
   wherein said plurality of busses carry transactions requiring synchronization, and wherein each of said one or more devices includes:
   a control signal generator connectable to said busses, said control signal generator capable of generating a control signal for each transaction, said control signal providing synchronization information required for the transaction for which it was generated.

2. The bus architecture of claim 1, wherein each device has at least one bus connection point, and wherein each of said bus connection points is connectable to each of said buses.

3. The bus architecture of claim 2, wherein each of said bus connection points provide either an input from said busses to one of said one or more devices or an output to said busses from one of said one or more devices, further comprising:
   a multiplexer for each bus connection providing said input from said busses; and
   a demultiplexer for each bus connection providing said output to said busses.

4. The bus architecture of claim 1, wherein at least one of said devices is a transmitting device transmitting a transaction onto at least one of said plurality of busses, said control signal generator of each of said transmitting devices generating a control signal providing all synchronization information required for transactions transmitted by its transmitting device.

5. The bus architecture of claim 1, wherein at least one of said devices is a transmitting device transmitting a transaction onto at least one of said plurality of busses, and at least one of said devices is a receiving device receiving said transaction, wherein:
   said control signal generator of each of said transmitting devices generates a first control signal, said first control indicating that said transaction is ready to be sent; and
   said control signal generator of each of said receiving devices generates a second control signal, said second control signal indicating that each of said receiving devices is ready to receive said transaction.

6. A method of providing connectivity between devices, comprising the steps of:
   providing a plurality of busses, said plurality of busses carrying transactions requiring synchronization;
   providing one or more devices with connectivity to said plurality of busses;
   providing selective connectivity of said one or more devices to said plurality of busses, whereby each device can be selectively connected to and disconnected from each of said busses; and
   generating a control signal for each transaction, said control signal providing synchronization information required for the transaction for which it was generated.

7. The method of claim 6, further comprising the steps of:
   providing each device with at least one bus connection point; and
   providing selective connectability between each of said bus connection points and each of said busses.

8. The method of claim 7, wherein each of said bus connection points provide either an input from said busses to one of said one or more devices or an output to said busses from one of said one or more devices, further comprising the steps of:
   providing a multiplexer for each bus connection providing said input from said busses; and
   providing a demultiplexer for each bus connection providing said output to said busses.

9. The method of claim 6, wherein at least one of said devices is a transmitting device transmitting a transaction onto at least one of said plurality of busses, wherein said generating step further comprises the steps of:
   generating a control signal providing all synchronization information required for transactions transmitted by its transmitting device.

10. The method of claim 6 wherein at least one of said devices is a transmitting device transmitting a transaction onto at least one of said plurality of busses, and at least one of said devices is a receiving device receiving said transaction, wherein said generating step further comprises:
   generating a first control signal, said first control indicating that said transaction is ready to be sent; and
   generating a second control signal, said second control signal indicating that each of said receiving devices is ready to receive said transaction.

* * * * *